UNITED STATES PATENT OFFICE.

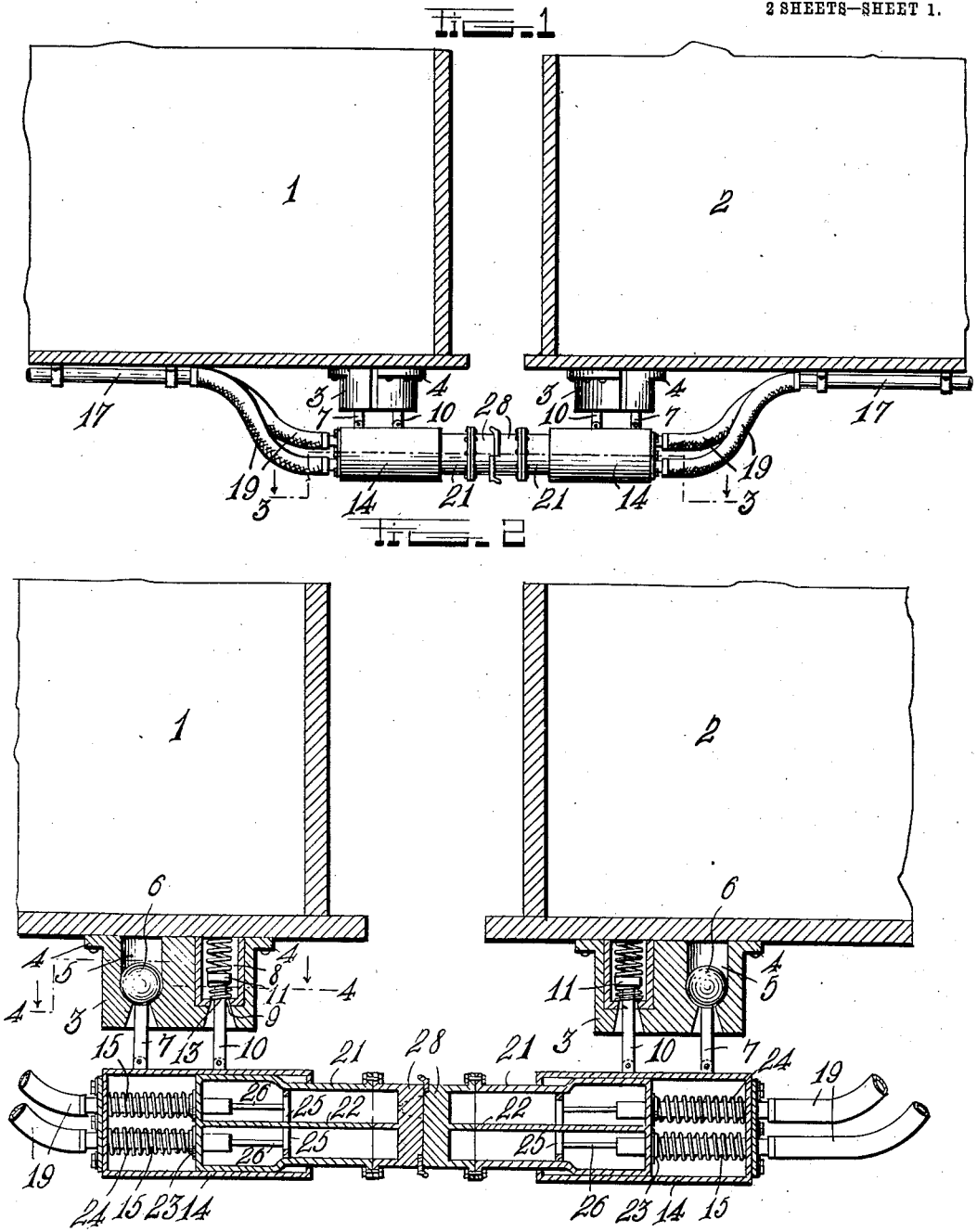

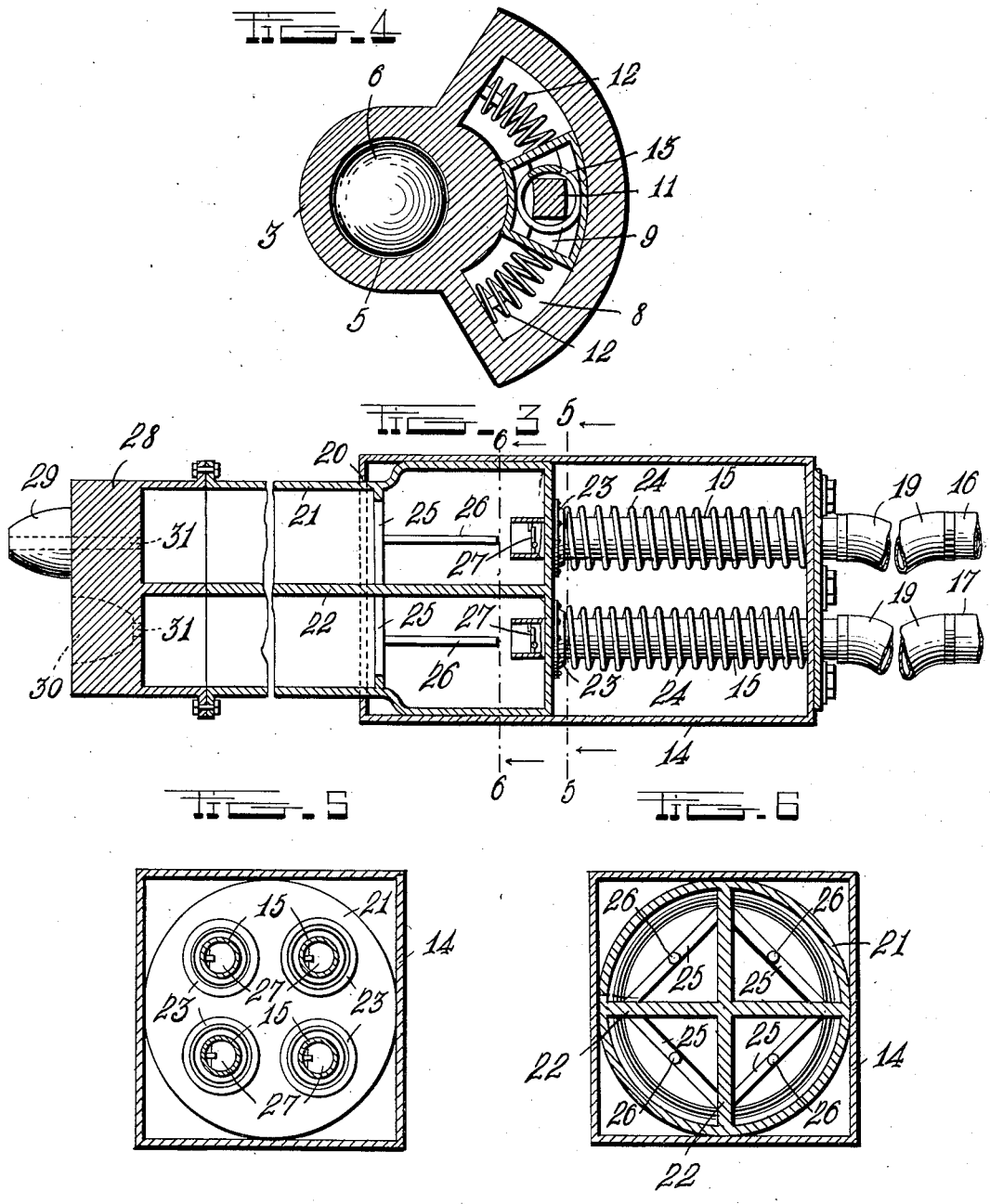

ADOLPHUS H. HARRIS, OF DENVER, COLORADO, ASSIGNOR TO INTERNATIONAL RAILROAD AUTOMATIC SAFETY PIPE COUPLING COMPANY, OF OMAHA, NEBRASKA.

AUTOMATIC SAFETY HOSE-COUPLING.

969,276. Specification of Letters Patent. Patented Sept. 6, 1910.

Application filed January 24, 1910. Serial No. 539,736.

*To all whom it may concern:*

Be it known that I, ADOLPHUS H. HARRIS, a citizen of the United States, residing at Denver, in the county of Denver and State of Colorado, have invented certain new and useful Improvements in Automatic Safety Hose-Couplers; and I do declare the following to be a full, clear, and exact description of the invention, such as will enable others skilled in the art to which it appertains to make and use the same.

My invention relates to couplers for air hose of railway braking systems and the object of the invention is the provision of a coupler of this type which will dispense with the flexible connections between the cars and provide a positive coupling which is adapted to accommodate as many fluids as is found to be necessary, such as compressed air, steam, cold and hot water, or any other fluid.

A still further object of the invention is the provision of a novel coupling box and a novel support for the same which permits the box to have lateral and vertical movement.

With the foregoing and other objects in view, the invention consists of certain novel features of construction, combination and arrangement of parts, as will be more fully described and particularly pointed out in the appended claims.

In the accompanying drawings, Figure 1 is a section taken through a pair of connected cars, showing the air coupling in side elevation; Fig. 2 is a longitudinal sectional view through the parts; Fig. 3 is a detail horizontal section on the line 3—3 of Fig. 1; Fig. 4 is a detail horizontal section on the line 4—4 of Fig. 2; Fig. 5 is a detail transverse section on the line 5—5 of Fig. 3; Fig. 6 is a transverse section on the line 6—6 of Fig. 3.

Referring more especially to the drawings, 1 and 2 represent the cars to be coupled, each of which is provided, upon their under surface, adjacent either end, with what may be termed supporting casings 3. These casings are provided with attaching flanges 4 and adjacent their rear end are provided with vertical recesses or sockets 5, in which the heads 6 of the pivoting pins 7 are adapted to be secured. The head 6 and socket 5 form a ball and socket joint which permits the pin to be moved universally.

The forward end of each casing is provided with an arcuate recess 8 and communicating with it is a slot 9 formed in the bottom of the casing, through which projects the supporting pin 10. This pin is provided with a head 11 which travels in the recess 8 and is held centrally on said recess by springs 12 arranged upon either side. The pin is also held with its head 11 elevated from the bottom of the recess by means of a spiral spring 13 which surrounds the shank and rests upon the bottom of the casing on either side of the slot.

Pivotally secured to the pins 7 and 10 of each casing, are coupling boxes 14, each of which has passing therethrough a plurality of cylinders 15 which are connected to the regular train pipes 16 and 17, as here shown, by flexible hose 19. As the pipes 16 and 17 are held rigid and the coupling box 14 is movable laterally and vertically, it is necessary that the flexible hose 19 be employed. The forward end of the box is apertured, at 20, in order to permit the passage of a coupling casing 21 which is divided up into as many compartments or channels, as may be found necessary, by partitions 22. The forward ends of these compartments have outlets and the rear ends of the compartments are apertured to receive the ends of the cylinders 15. The connection between the cylinders and the coupling casings is made fluid tight by means of packing glands 23 which permit the casing to slide upon the cylinders against the tension of suitable springs 24 without losing any air to the main coupling box.

Bridged across the channels in the coupling casing, are struts 25 having projecting at right angles therefrom the valve operating pins 26 which are adapted to enter the ends of the cylinders 15 and operate the flap valves 27 arranged therein.

Carried by the outer end of the coupling casing is a coupling head 28 which is preferably provided with two or more cone-shaped projections 29 adapted to enter similarly shaped sockets 30 formed in the coupling head on the opposite coupling. Leading through these projections and through the head and also from the sockets, are channels 31 which register with the separate sections in the coupling casing, as divided by the partitions 22.

In operation, the coupling box, being connected to the pin 10, has its forward end adapted to swing laterally in a horizontal direction and at the same time is permitted to move upwardly and downwardly by reason of the flexibility of the spring 13. Any unevenness, therefore, between the separate cars, is promptly taken up and the coupling heads 29 kept in constant fluid tight engagement, the sockets 30 preferably holding rubber or other suitable gaskets which will make these joints fluid tight. When both couplings are in engagement with one another, the coupling casing in each box is forced backwardly through the opening 20 over the cylinders 15 against the tension of the springs 24, thus bringing the pins 26 into engagement with the valves 27, opening the same and permitting the fluid from the pipes 16, 17 to flow through into the next car. When the cars are uncoupled, the springs 24 force the coupling casing outwardly and the valves closed automatically by reason of the pressure thereagainst.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention, as defined in the appended claims.

Having thus described my invention, what I claim is:

1. An air coupling box support comprising a casing, a pin pivotally mounted in the casing and connected to the coupling to support one end thereof, and means carried by the casing and connected to the opposite end of the coupling adapted to permit lateral movement of the coupling.

2. An air coupling box support comprising a casing, a pin pivotally mounted in the casing and connected to the coupling to support one end thereof, and means carried by the casing and connected to the opposite end of the coupling adapted to permit lateral and vertical movement of the coupling.

3. A coupling box support comprising a casing, a pin pivotally mounted in the casing and having connection with the coupling, a pin connected to the opposite end of the coupling and having connection with the casing, means to normally hold said pin centrally of the casing, and means to normally hold said pin elevated in the casing.

4. In an air hose coupler for cars, a coupling box, a support for the same, a frame slidably mounted within the coupling box and having a plurality of separated channels, cylinders in the box having relative movement with respect to said frame, valves in said cylinders to control the air to said channels, a coupling head upon said frame, and means operated in the connection of separate cars for opening all of the valves in said cylinders simultaneously.

5. In a device of the class described, a casing, a plurality of cylinders mounted in said casing, valves in said cylinders, a frame slidably mounted upon said cylinders within the casing and having separated compartments for each cylinder, a coupling head carried by said frame having channels registering with the compartments in said frame, and means carried in said compartments and operated simultaneously with the frame when separate cars are coupled to open the valves in the cylinders.

In testimony whereof I have hereunto set my hand in presence of two subscribing witnesses.

ADOLPHUS H. HARRIS.

Witnesses:
Jos. B. OSMAN,
R. O. JONES.